A. MOIR.
ATTACHMENT FOR CHECK ROW SEED PLANTERS.
APPLICATION FILED OCT. 21, 1915.
1,186,419.
Patented June 6, 1916.
3 SHEETS—SHEET 3.
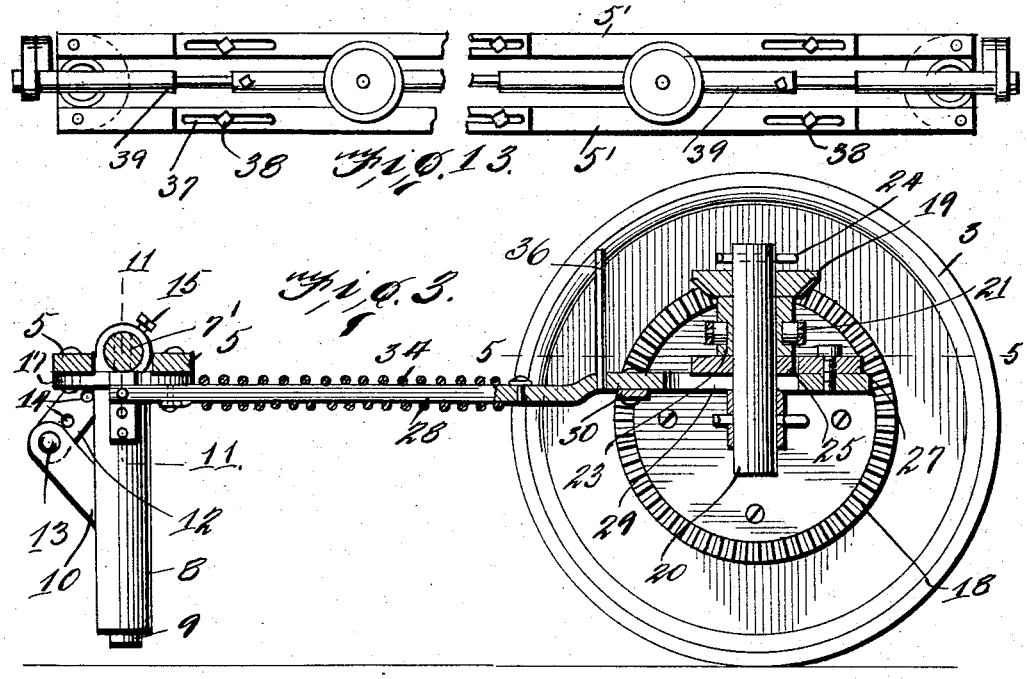
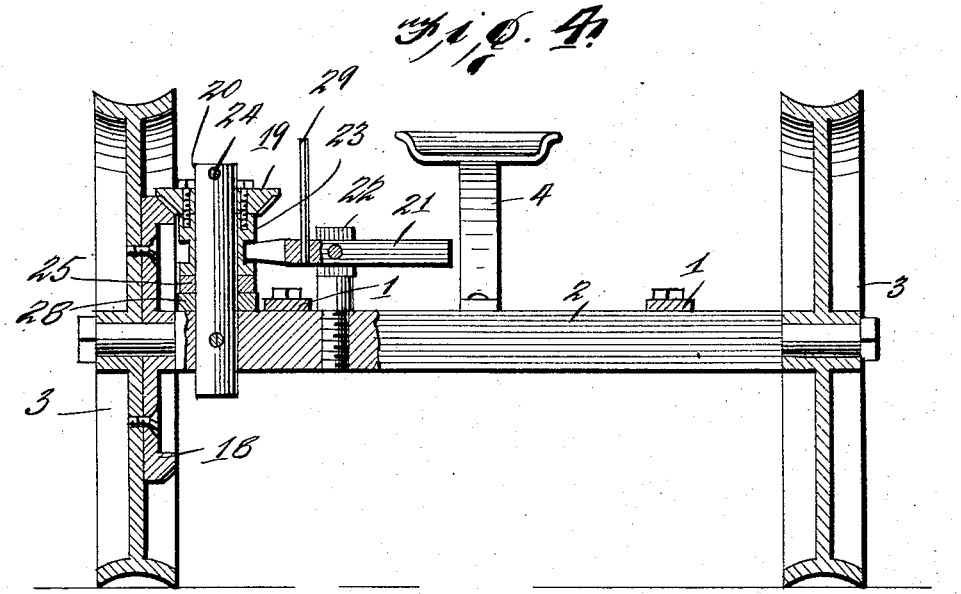

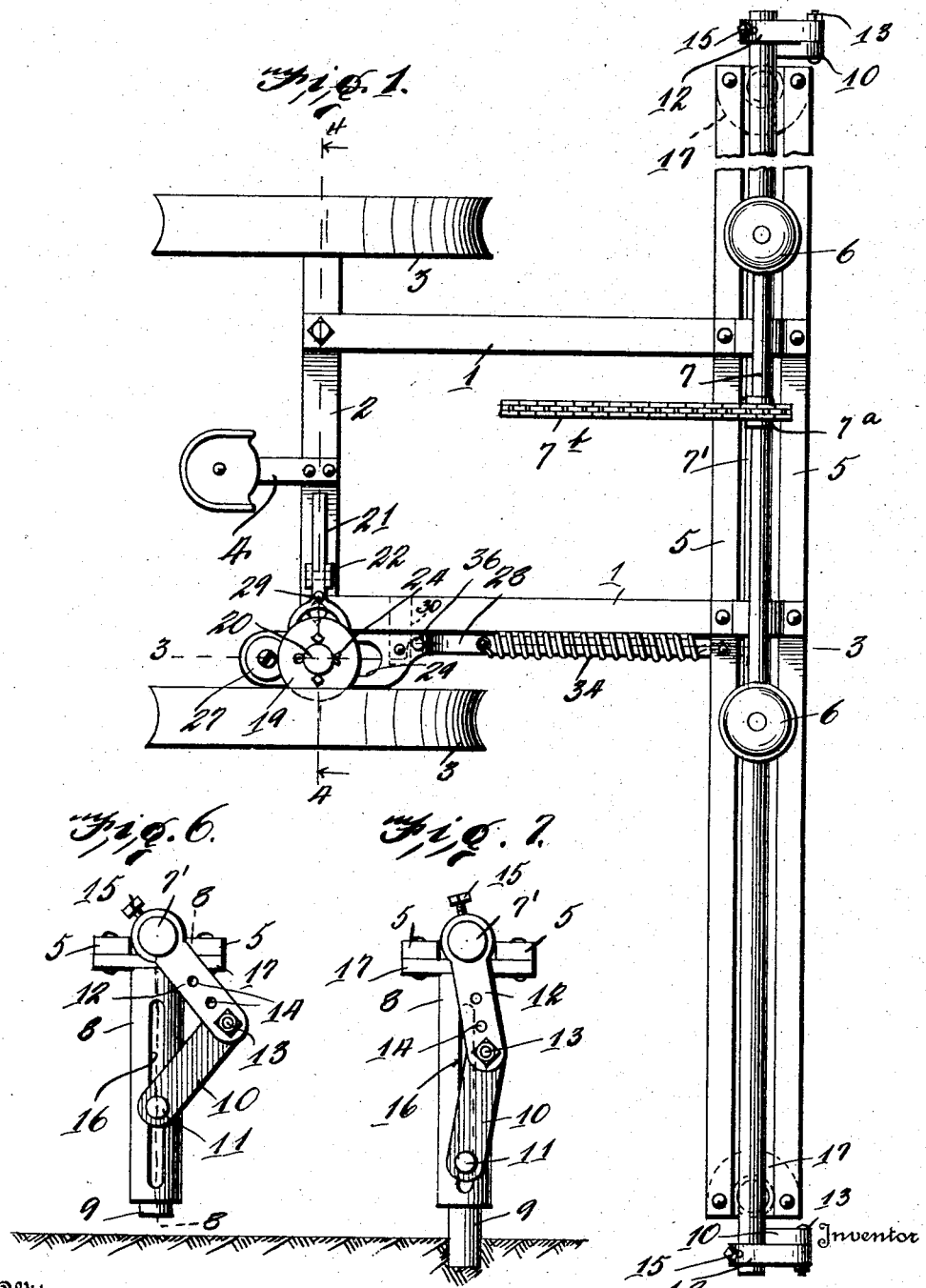

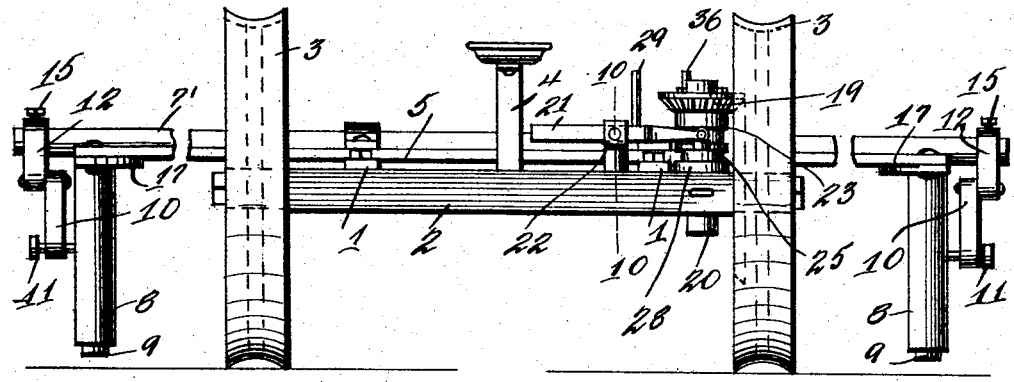
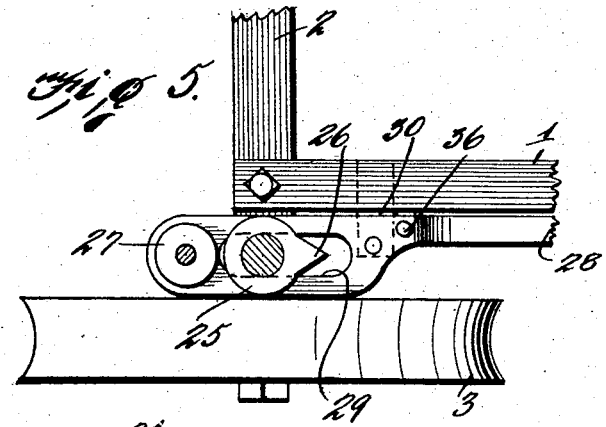
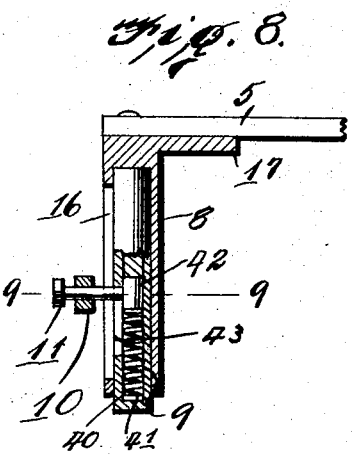
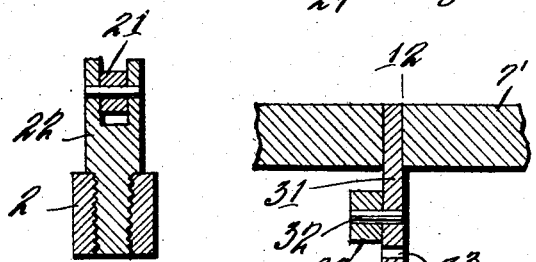
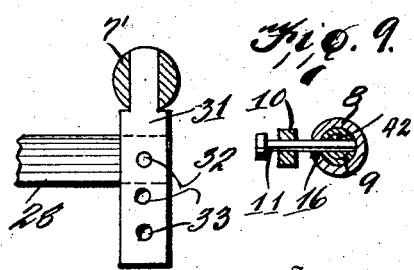
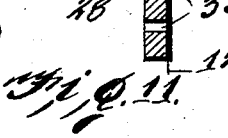

UNITED STATES PATENT OFFICE.

ALEXANDER MOIR, OF BURLINGTON, IOWA.

ATTACHMENT FOR CHECK-ROW SEED-PLANTERS.

1,186,419.  Specification of Letters Patent.  Patented June 6, 1916.

Application filed October 21, 1915. Serial No. 57,135.

*To all whom it may concern:*

Be it known that I, ALEXANDER MOIR, a citizen of the United States of America, residing at Burlington, in the county of Des Moines and State of Iowa, have invented certain new and useful Improvements in Attachments for Check-Row Seed-Planters, of which the following is a specification, reference being had therein to the accompanying drawing.

This invention relates to attachments for check-row seed planters and has for its object the production of a simple and efficient device which will plant seeds at predetermined points in a field in what is called "check-rows". In this manner by means of the present machine the seeds are planted in the ground upon the intersection of lines drawn in two directions or at right angles to each other.

Another object of this invention is the production of a simple and efficient mechanism which will cause the markers and seed dropping devices to be positively actuated at predetermined intervals for the purpose of marking the field and also depositing seed therein in proper spaced relation whereby the field may be easily cultivated after the crops have started to grow, without danger of digging up the crops which have been planted in the hills made possible by the present invention.

A still further object of this invention is the production of a simple and efficient check-row seed planter which consists of a minimum number of parts, is efficient in operation and which is very durable and inexpensive to operate.

With these and other objects in view, this invention consists of certain novel combinations, constructions, and arrangements of parts, as will be hereinafter fully described and claimed.

In the accompanying drawings:—Figure 1 is a top plan view of the planter, one end thereof being broken away to permit an enlarged illustration of the detailed portions of the device. Fig. 2 is a rear elevation of the structure shown in Fig. 1. Fig. 3 is a section taken on line 3—3 of Fig. 1. Fig. 4 is a section taken on line 4—4 of Fig. 1. Fig. 5 is a section taken on line 5—5 of Fig. 3. Fig. 6 is an end elevation of one of the markers, showing the same in a raised position. Fig. 7 is a side elevation of one of the markers showing the same in an extended position. Fig. 8 is a section taken on line 8—8 of Fig. 6. Fig. 9 is a section taken on line 9—9 of Fig. 8. Fig. 10 is a section taken on line 10—10 of Fig. 2. Fig. 11 is a section taken on line 11—11 of Fig. 3. Fig. 12 is a section taken on line 12—12 of Fig. 11, the hanger member being shown in side elevation. Fig. 13 is a top plan view of an embodiment of the invention showing the frame supporting the seed boxes or seed dropping devices and the operating shaft as being adjustable.

Referring to the accompanying drawings by numerals it will be seen that 1 designates the frame which is supported by means of a rear axle 2 carrying the land wheels 3. A seat 4 is carried upon the rear axle 2 as illustrated.

It of course should be understood that the present planter may be driven by any suitable means such as motive power or by means of draft animals, without departing from the spirit of the invention and it is thought unnecessary to illustrate any means for so driving the device as it will fall within the skill of any mechanic to provide such driving connection.

A transversely extending frame 5 is carried upon the forward end of the frame 1 and a plurality of seed boxes 6 of suitable construction are carried by this frame 5. An operating shaft 7 is carried upon the frame 5 which shaft 7 operates the seed dropping devices 6 in any suitable or convenient manner. A marker frame 8 is supported upon each end of the frame 5 and a marking plunger 9 is reciprocally mounted in the casing or frame 8. This plunger 9 is pivotally connected to a link 10 by means of a pin 11 and this link 10 is adjustably connected to an arm 12 carried by the shaft 7', the connection being made by means of a bolt 13 passing through one of the adjusting apertures 14 formed in the arm 12. This arm 12 is securely fastened and held in engagement with the shaft 7' by means of the adjusting nut 15. The frame or casing 8 is provided with a vertically extending slot 16 through which the pin 11 passes for the purpose of reciprocating the marking plunger 9 as the shaft 7' is oscillated by means of the mechanism to be hereinafter described. This casing 8 is provided with a flared upper end 17, which flared upper end 17 is securely fastened to the under face of the frame 5 as illustrated clearly in Figs. 1 and 6 of the drawings, as well as Fig. 8 thereof.

One of the wheels 3 carries a gear wheel 18 as illustrated in Fig. 4 and this gear 18 which is beveled, is adapted to mesh with a beveled pinion 19, which pinion 19 is carried by a vertically extending shaft 20, supported upon the axle 2. A clutch lever 21 is pivotally supported upon a standard 22 and engages the sleeve 23 carried by the pinion 19 for shifting the pinion 19 vertically upon the shaft 20 to throw the pinion into and out of engagement with the gear 18. A transversely extending pin 24 is carried by the shaft 20 and limits the vertical sliding movement of the pinion 19 upon the shaft 20. A cam disk 25 is also secured to the lower face of the sleeve 23 and is provided with a cam nose 26, which nose 26 is adapted to engage the roller 27 of the actuating rod 28 carried by the frame 1. This actuating rod 28 is provided with a longitudinally extending slot 29 through which the shaft 20 passes. The roller 27 is carried by the rear end of the actuating rod or bar 28.

As will be seen by considering Fig. 4, the clutch lever 21 is provided with an upwardly extending handle 29 to facilitate the operation of the lever 21 by means of the hand of the operator when so desired. The lever 28 is provided with a guiding plate 30 upon the bottom thereof, which guiding plate slides under one of the side bars of the frame 1 as illustrated in Figs. 1 and 5 of the drawings. The forward end of the actuating bar 28 is pivotally connected to a downwardly extending finger 31 of the shaft 7' by means of a pin 32 which fits in one of the adjusting apertures 33 formed in the finger 31. A coiled spring 34 is carried by the actuating lever 28 and has the rear end thereof secured to the actuating lever 28 and the forward end thereof secured to the frame 5.

From the foregoing description it will be seen that the device operates as follows: As the machine travels in a forward direction, the actuating lever 28 will be reciprocated through the medium of the gear 18 and pinion 19 as above described, in view of the fact that the cam disk 25 will engage the roller 27 of the actuating rod 28 and cause such a reciprocating movement, the coiled spring 34 returning the actuating rod 28 to its normal position after being shifted by means of the cam disk 25. It of course should be understood that the actuating rod 28 may be shifted manually by means of the vertically extending rod 36, illustrated in Fig. 3. By the reciprocation of the rod 28, the shaft 7' will be caused to oscillate.

The seed dropping devices 6 are supported above the frame 5 and these seed dropping devices 6 are actuated by a shaft 7 which shaft 7 is operated in the usual manner by means of a sprocket 7ª and chain 7ᵇ. It should be understood that the marking plungers 9 are used only to mark the ground or field over which the planter is passing in order that the planter may be guided in its return trip. The planter is so operated as to cause the seed dropper near one end to drop seed just over the impression made by the outside plunger 9 on its previous trip. A plunger is made on each end of the machine in order to permit the same to be turned either to the right or left when reversing for its return trip.

The plunger 9 is provided with a socket 40 in which is seated a coil spring 41. A block 42 is supported by the spring 41. The pin 11 above referred to, passes through a slot 43 formed in the plunger 9, thereby producing a yieldable marking plunger which will not be likely to become injured provided the same should engage a rock or other hard substance.

In Fig. 13 there is shown an embodiment of the invention or modified form thereof wherein the frame 5' is made adjustable, having the longitudinally extending slots 37 formed upon the several sections through which the bolts 38 pass for locking the sections in an adjustable position, the frame 5' being adjustable between each seed dropping device as well as between the seed dropping devices and marking devices carried by the frame 1. The oscillating shaft 39 is also made adjustable in order that the same may be made of proper length with respect to the frame 5', as illustrated in Fig. 13 of the drawings.

It should be understood that the present invention, especially the adjustable feature thereof, may be modified in its detailed mechanism without departing from the spirit of the invention and that any mechanical detailed changes may be made therein so long as the structure is confined to the invention outlined in the appended claims.

It should be understood that the present invention is especially adapted to mark the ground or surface over which the planter is passing at a suitable distance from the axis of the machine for the planting of the next row of seed and at such a time as the seed is deposited. In this manner it will be seen that the mark made upon the field serves to assist the operator in driving the machine in the desired direction and also enables the operator to be sure that the seed is deposited in the proper lines or in check-rows.

What I claim is:—

1. In a machine of the class described the combination with a frame, a plurality of seed dropping devices, marking devices, a shaft for actuating said marking devices, means for operating said seed dropping devices, an actuating rod connected to said shaft, wheels supporting said frame, a gear carried by one of said wheels, a pinion adapted to mesh with said gear, a shaft supporting said pinion, a clutch sleeve secured to said pinion, a clutch lever secured to said clutch sleeve for reciprocating said pinion, said actuating rod provided with longitudinally extending slot, a roller carried by the rear end of said actuating rod, said cam adapted to engage said roller for moving said rod rearwardly, a spring connected to said rod for returning said rod to its normal position, and means for facilitating the manual operation of said rod.

2. In a machine of the class described the combination with a frame, a seed dropping device, a marking device, means for actuating said marking device, means for actuating said seed dropping device, said marking device comprising a frame, a plunger working in said frame, said plunger provided with a socket, a spring positioned within said socket, a block supported by said spring, means for connecting said actuating means of said seed dropping device to said block whereby said plunger may be yieldably forced downwardly.

3. In a machine of the class described the combination with a frame, a seed dropping device, a marking device, means for actuating said marking device, means for actuating said seed dropping device, said means for actuating said seed dropping device comprising an operating rod, a driving shaft, a cam carried by said driving shaft, clutch means for throwing said cam into and out of operation, said operating rod provided with a longitudinally extending slot, said operating rod passing through said slot, and a revolving roller carried by the outer end of said operating rod and adapted to engage said cam for facilitating the reciprocating movement of said operating rod as said cam is rotated.

In testimony whereof I hereunto affix my signature.

ALEXANDER MOIR.

Copies of this patent may be obtained for five cents each, by addressing the "Commissioner of Patents, Washington, D. C."